(12) United States Patent
Lee et al.

(10) Patent No.: US 8,505,040 B2
(45) Date of Patent: Aug. 6, 2013

(54) ADJUSTMENT MECHANISM FOR OPTICAL PICKUP HEAD OF OPTICAL DISK DRIVE

(75) Inventors: In-Shuen Lee, Hsinchu (TW); Hui-Chung Leu, Hsinchu (TW); Ming-Chun Tsao, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 0 days.

(21) Appl. No.: 13/326,283

(22) Filed: Dec. 14, 2011

(65) Prior Publication Data

US 2013/0125151 A1 May 16, 2013

(30) Foreign Application Priority Data

Nov. 15, 2011 (CN) .......................... 2011 1 0361368

(51) Int. Cl.
*G11B 7/00* (2006.01)
*G11B 17/03* (2006.01)

(52) U.S. Cl.
USPC .......................................... 720/675; 720/673

(58) Field of Classification Search
USPC .................................................. 720/672–680
See application file for complete search history.

(56) References Cited

U.S. PATENT DOCUMENTS

| | | | | |
|---|---|---|---|---|
| 5,982,735 A * | 11/1999 | Tsai | ............................. | 720/675 |
| 6,795,971 B2 * | 9/2004 | Lin | ............................. | 720/679 |
| 2002/0186646 A1 * | 12/2002 | Akiba | ......................... | 369/249 |

* cited by examiner

*Primary Examiner* — Nathan Danielsen
(74) *Attorney, Agent, or Firm* — Jianq Chyun IP Office

(57) ABSTRACT

An optical disk drive including a case, a traverse, a guide rod, an optical pick-up head and at least a locking member is provided. The traverse is disposed in the case and includes at least a cantilever part and at least a locking hole. The cantilever part protrudes from a carrying surface of the traverse and is integrated with the traverse. The guide rod leans against a bearing end of the cantilever part. The optical pick-up head is slidably disposed on the guide rod. The locking member includes a leaning part and a locking part. The locking part is locked into the locking hole and the leaning part presses an upper side of an end of the guide rod for making the bearing end generate a bending displacement toward the carrying surface through the guide rod.

9 Claims, 4 Drawing Sheets

US 8,505,040 B2

ADJUSTMENT MECHANISM FOR OPTICAL PICKUP HEAD OF OPTICAL DISK DRIVE

CROSS-REFERENCE TO RELATED APPLICATION

This application claims the priority benefit of China application serial no. 201110361368.7, filed on Nov. 15, 2011. The entirety of the above-mentioned patent application is hereby incorporated by reference herein and made a part of this specification.

BACKGROUND OF THE INVENTION

1. Field of the Invention

The present invention relates to an optical disk drive, and more particularly to an optical disk drive capable of adjusting a deflection state of an optical pick-up head.

2. Description of Related Art

With respect to precision of an optical disk drive hardware device, apart from precision of individual components during manufacturing, precision during assembly of optical disk drive components is also a key factor that decides whether an optical disk can be read correctly or not. As volumes of optical disk drives available on the market are becoming smaller, internal spaces therein are greatly limited. Therefore, if position relations between the optical pick-up head of the optical disk drive and other peripheral assemblies thereof fail to meet the precision requirement, for example, when the position of the optical pick-up head of the optical disk drive deflects, with a high rotating speed, the optical disk disposed on a motor is likely to be damaged and cause damage to the optical disk drive.

In a conventional deflection adjustment mechanism of the optical pick-up head, a spring is usually disposed under a guide rod to provide a pre-pressing force, so that the guide rod can utilize an elastic force of the spring to adjust a position in a vertical direction. However, for the production line, an extra spring needs to be disposed during assembly, and because the spring is small, from the perspective of assembly, either allocating the springs or disposing the spring on a fixed position increases time for producing the optical disk drive on the production line.

SUMMARY OF THE INVENTION

Accordingly, the present invention is directed to an optical disk drive capable of adjusting a deflection state of an optical pick-up head thereof.

The present invention provides an optical disk drive including a case, a traverse, a guide rod, an optical pick-up head and at least a locking member. The traverse is disposed in the case and includes at least a cantilever part and at least a locking hole. The cantilever part protrudes from a carrying surface of the traverse and is integrated with the traverse. The guide rod leans against a bearing end of the cantilever part. The optical pick-up head is slidably disposed on the guide rod. The locking member includes a leaning part and a locking part. The locking part is locked into the locking hole and the leaning part presses an upper side of an end of the guide rod for making the bearing end generate a bending displacement toward the carrying surface through the guide rod.

Based on the above, the present invention utilizes a structure of the cantilever part integrated with the traverse to bear a pressing force applied thereon by the guide rod when guide rod is locked and provide a bending displacement, so that a locking height of the guide rod can be adjusted without adding an extra spring or other elastic element in the present invention, thereby adjusting the deflection of the optical pick-up head disposed on the guide rod. Therefore, the present invention not only simplifies a manufacture procedure of the optical disk drive, but also prevents the assembly of elastic element from being missed, thereby improving a yield rate of the product.

In order to make the aforementioned features and advantages of the present invention comprehensible, embodiments are described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
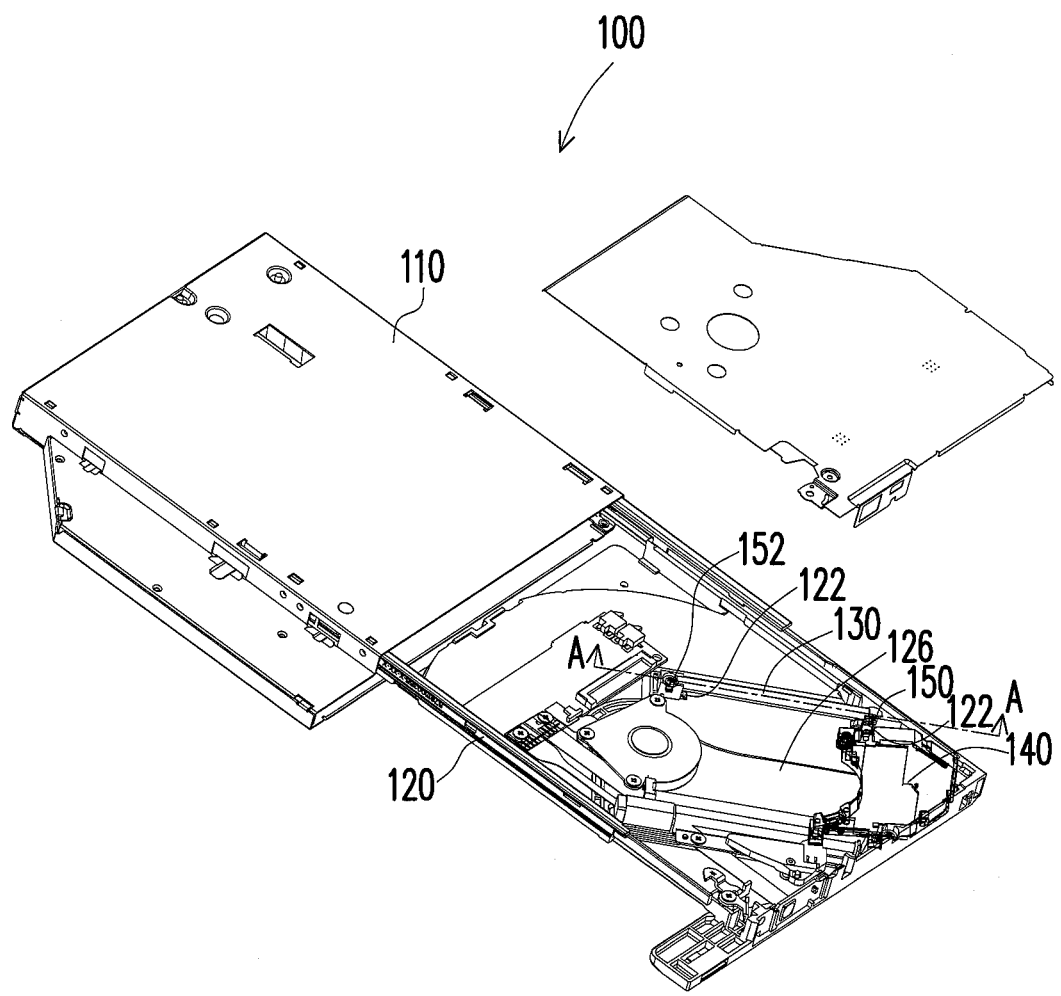
FIG. 1 is an exploded view of a part of members of an optical disk drive according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
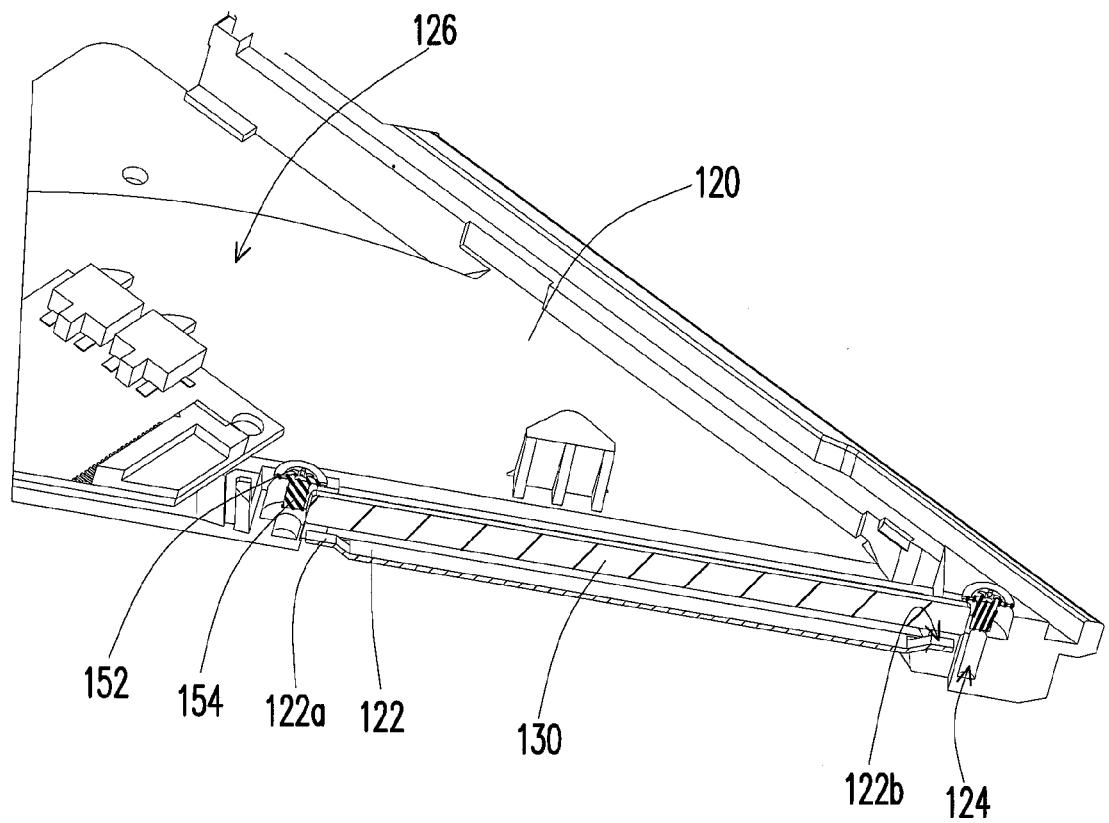
FIG. 2 is a sectional schematic view of FIG. 1 along an A-A line.

FIG. 1 is an exploded view of a part of members of an optical disk drive according to an embodiment of the present invention. FIG. 2 is a sectional schematic view of FIG. 1 along an A-A line. Referring to FIG. 1 and FIG. 2, in this embodiment, an optical disk drive 100 includes a case 110, a traverse 120, a guide rod 130, an optical pick-up head 140 and a locking member 150. Types of the optical disk drive 100 are not limited in the present invention, and the optical disk drive 100 may be a half height optical disk drive (HH ODD), a slim tray optical disk drive (slim tray ODD) or a slot-in optical disk drive (slot-in ODD). The traverse 120 is movably into and out of the case 110, and includes at least a cantilever part 122 and at least a locking hole 124. In this embodiment, the traverse 120 is made of a plastic material. The cantilever part 122 protrudes from a carrying surface 126 of the traverse 120, and the cantilever part 122 and the carrying surface 126 are not coplanar. An end of the guide rod 130 leans against a bearing end 122a of the cantilever part 122. The optical pick-up head 140 is slidably disposed on the guide rod 130. Generally, two guide rods 130 exist in the optical disk drive 100 and are disposed parallel to each other. Two opposite ends of the optical pick-up head 140 are slidably disposed on the two guide rods 130, so that the optical pick-up head 140 can move back and forth on the guide rods 130 to read/write data in an optical disk.

The locking member 150 includes a leaning part 152 and a locking part 154, and the locking part 154 is locked into the locking hole 124. In this embodiment, the locking member 150 is a screw, and the locking hole 124 is a screw hole. The leaning part 152 presses another end of the guide rod 130 for making the bearing end 122a generate a bending displacement BD (shown in FIG. 6) toward the carrying surface 126 through the guide rod 130.

Figure 3:
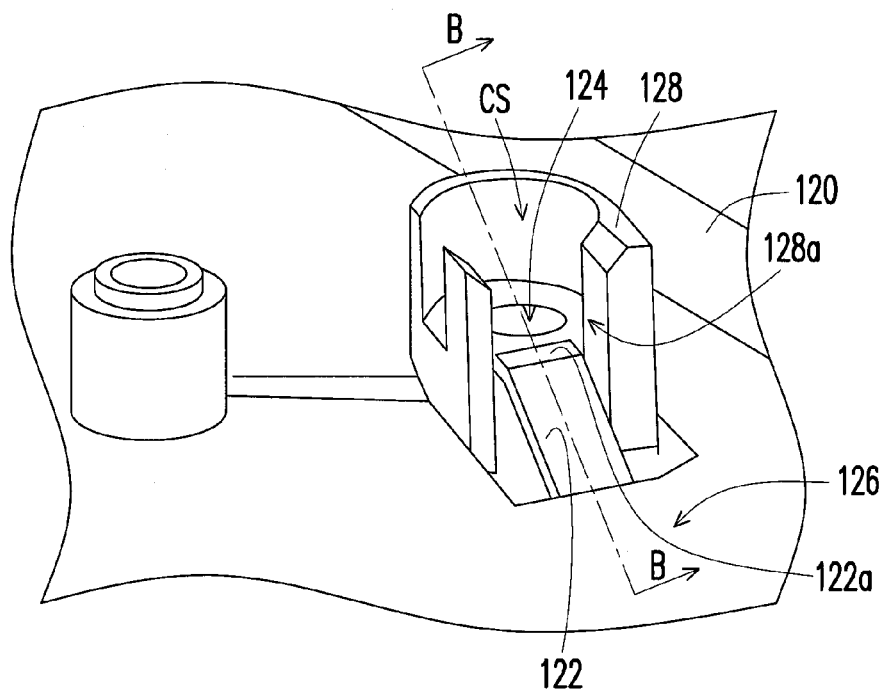
FIG. 3 is a schematic view of a cantilever part and a locking hole according to an embodiment of the present invention.
Figure 4:
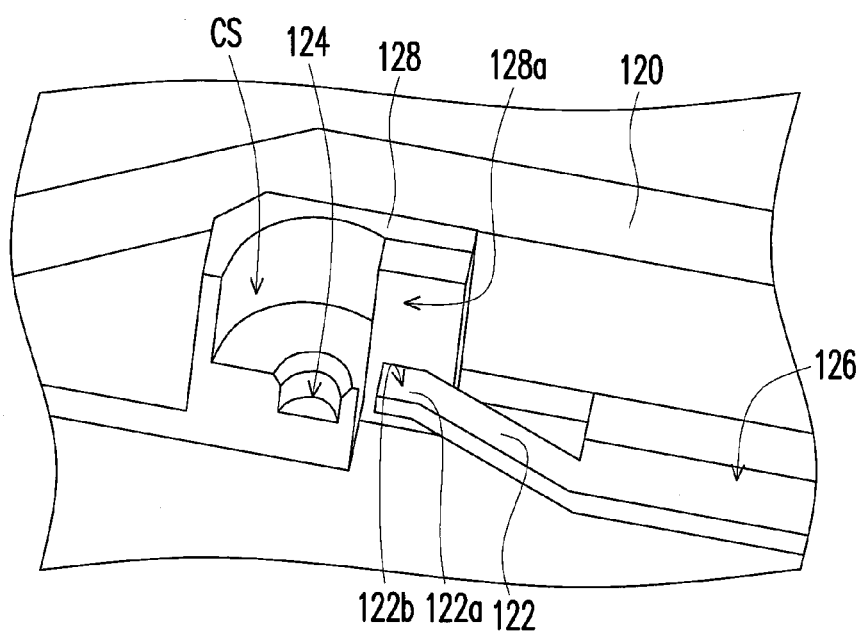
FIG. 4 is a sectional schematic view of FIG. 3 along a B-B line.

FIG. 3 is a schematic view of a cantilever part and a locking hole according to an embodiment of the present invention. FIG. 4 is a sectional schematic view of FIG. 3 along a B-B line. Referring to FIG. 3 and FIG. 4, in this embodiment, the cantilever part 122 and the traverse 120 are integrally formed and are made of the same plastic material. The bearing end 122a of the cantilever part 122 includes a plane 122b, and an end of the guide rod 130 leans against the plane 122b. Specifically, the traverse 120 may further include a barrier wall 128 surrounding the locking hole 124 and located on the carrying surface 126, used for forming a containing space CS to receive a part of the locking member 150 or all of the leaning part 152. The barrier wall 128 further includes an accommodating opening 128a for receiving an end part of the guide rod 130, and the end part of the guide rod 130 is adapted to moving in a direction perpendicular to the carrying surface 126 in the accommodating opening 128a, so that the assembly personnel adjusts a locking position of the guide rod 130 through a depth for which the locking member 150 is locked into the locking hole 124.

Figure 5:
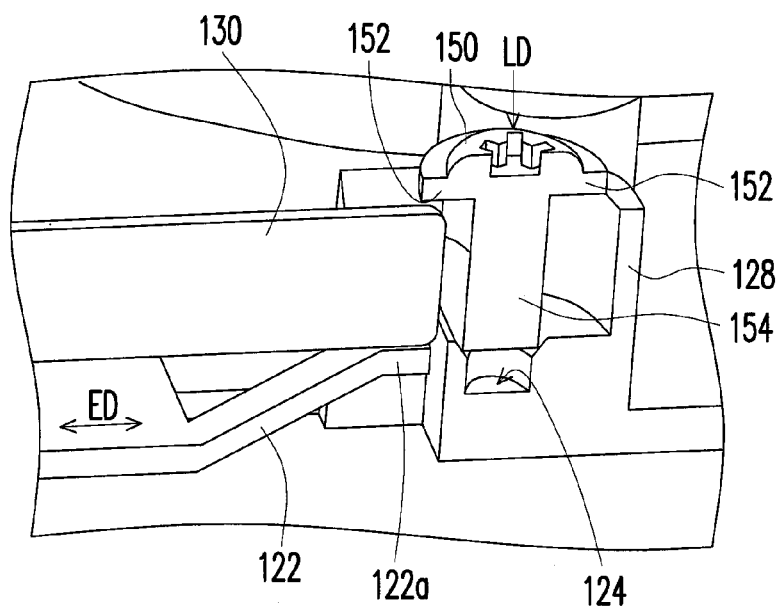
FIG. 5 is a sectional schematic view of a guide rod, a cantilever part and a locking member before locking.
Figure 6:
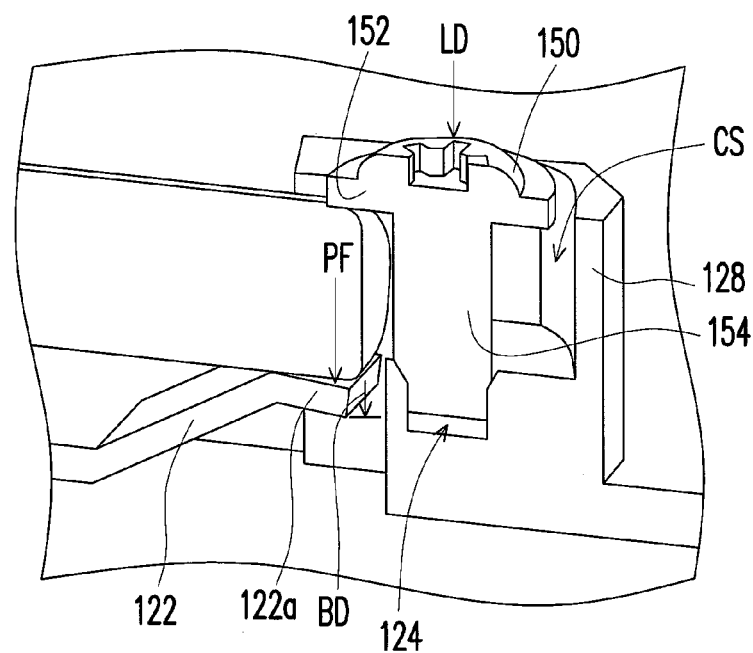
FIG. 6 is a sectional schematic view of a guide rod, a cantilever part and a locking member after locking.

FIG. 5 is a sectional schematic view of a guide rod, a cantilever part and a locking member before locking. FIG. 6 is a sectional schematic view of a guide rod, a cantilever part and a locking member after locking. Referring to FIG. 5, in this embodiment, an end of the guide rod 130 leans against the plane 122b of the bearing end 122a of the cantilever part 122, and an extending direction ED of the cantilever part 122 is parallel to an axial line of the guide rod 130. The bearing end 122a of the cantilever part 122 resigns in the accommodating opening 128a. Referring to FIG. 6, the locking member 150 is locked into the locking hole 124 from above the locking hole 124 along a locking direction LD, and the leaning part 152 thereof presses the guide rod 130 to move along the locking direction LD and make the bearing end 122a bear a pressing force PF, thereby further generating a corresponding bending displacement BD. Therefore, the assembly personnel can utilize the bending displacement BD provided by the cantilever part 122 of the traverse 120 to adjust the depth for which the locking member 150 is locked, thereby controlling the locking height of an end point of the guide rod 130, so that the optical pick-up head slidably disposed on the guide rod 130 can reach a preset horizontal position.

As the cantilever part 122 protruding from the traverse 120 is utilized to provide the bending displacement BD in the present invention, no extra spring or other elastic element needs to be added, and the extending direction ED of the cantilever part 122 is not limited to the direction parallel to the guide rod 130. So long as the guide rod 130 leans against the bearing end 122a of the cantilever part 122 and the locking member 150 can make the bearing end 122a generate a bending displacement BD toward the carrying surface 126 through the guide rod 130, the technical effects of the foregoing embodiment can be achieved. Therefore, persons skilled in the art may make adjustments and variations to the appearance, disposition direction and position of the cantilever part 122 without departing from the spirit and scope of the present invention.

In addition, as shown in FIG. 1, since the optical pick-up head 140 is slidably disposed on the two guide rods 130, a horizontal position thereof may be adjusted through the height of four ends of the two guide rods 130. However, only the height of three ends of the two guide rods 130 needs to be adjusted in fact, to achieve the affect of adjusting a tilt degree of a plane. Therefore, for the convenience of assembly, in an embodiment of the present invention, one end of the two guide rods 130 may be fixedly disposed on the traverse 120, and the cantilever part 122 may be disposed under other three ends of the two guide rods 130, so that the assembly personnel only needs to adjust the locking height of the other three ends to be coplanar with the end fixedly disposed on the traverse 120.

Based on the above, the present invention utilizes a structure of the cantilever part integrated with the traverse to bear a pressing force applied thereon by the guide rod when guide rod is locked and provide a bending displacement, so that a locking height of the guide rod can be adjusted without adding an extra spring or other elastic element in the present invention, thereby adjusting the deflection of the optical pick-up head disposed on the guide rod. Therefore, no extra elastic element needs to be added in the present invention, which not only saves production cost, but also simplifies an assembly process of the optical disk drive and further prevents the assembly of the elastic element from being missed, thereby improving a production efficiency and yield rate of the product.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical disk drive, comprising:
   a case;
   a traverse, disposed in the case and comprising at least a cantilever part and at least a locking hole, wherein the cantilever part protrudes from a carrying surface of the traverse and is integrally formed with the traverse;
   a guide rod, disposed above the cantilever part and leaning against a bearing end of the cantilever part;
   an optical pick-up head, slidably disposed on the guide rod; and
   at least a locking member, comprising a leaning part and a locking part, wherein the locking part is locked into the locking hole and the leaning part disposes above the guide rod and presses an upper side of an end of the guide rod for making the bearing end generate a bending displacement toward the carrying surface through the guide rod.

2. The optical disk drive according to claim 1, wherein the bearing end comprises a plane, and the guide rod leans against the plane.

3. The optical disk drive according to claim 2, wherein another end of the guide rod is fixedly disposed on the traverse.

4. The optical disk drive according to claim 1, wherein the traverse comprises a barrier wall surrounding the locking hole, used for forming a containing space above the locking hole to receive the leaning part of the locking member, and the barrier wall comprises an accommodating opening for receiving the end of the guide rod; the end of the guide rod is adapted to moving along a direction perpendicular to the carrying surface in the accommodating opening.

5. The optical disk drive according to claim 4, wherein at least a part of the bearing end is located in the accommodating opening.

6. The optical disk drive according to claim 1, wherein an extending direction of the cantilever part is parallel to an axial line of the guide rod.

7. The optical disk drive according to claim 1, wherein the locking member and the locking hole are respectively a screw and a screw hole.

8. The optical disk drive according to claim 2, wherein the plane is parallel to the carrying surface.

9. The optical disk drive according to claim 8, wherein the cantilever part has an inclined surface for connecting the carrying surface and the plane.

* * * * *